United States Patent [19]

Eales

[11] Patent Number: 4,560,094

[45] Date of Patent: Dec. 24, 1985

[54] PARTICULATE SOLID STORAGE CONTAINER AND TRANSPORT METHOD

[75] Inventor: David F. Eales, Kinnesswood, Scotland

[73] Assignee: British Gas Corp., London, England

[21] Appl. No.: 513,407

[22] Filed: Jul. 14, 1983

Related U.S. Application Data

[63] Continuation of Ser. No. 231,301, Feb. 3, 1981, abandoned.

[30] Foreign Application Priority Data

Dec. 3, 1980 [GB] United Kingdom ............... 8039716

[51] Int. Cl.[4] ............................................. B65G 53/50
[52] U.S. Cl. ................................. 222/195; 222/630; 406/123; 406/138
[58] Field of Search ............... 222/195, 630; 406/123, 406/138

[56] References Cited

U.S. PATENT DOCUMENTS

| | | | |
|---|---|---|---|
| 2,686,617 | 8/1954 | Tolman, Jr. et al. | 222/195 |
| 3,246,805 | 4/1966 | Kemp | 222/195 |
| 3,305,142 | 2/1967 | Caldwell | 222/195 |
| 4,059,311 | 11/1977 | Spitzer et al. | 222/195 X |
| 4,221,509 | 9/1980 | Balzau et al. | 222/195 X |

FOREIGN PATENT DOCUMENTS

| | | | |
|---|---|---|---|
| 1152058 | 7/1963 | Fed. Rep. of Germany | 406/138 |
| 2400996 | 7/1975 | Fed. Rep. of Germany | 222/195 |
| 457262 | 7/1968 | Switzerland | 406/123 |

Primary Examiner—Charles A. Marmor
Attorney, Agent, or Firm—Larson and Taylor

[57] ABSTRACT

A storage container for solid particulate materials includes a source of 'lubrication' gas coupled to a fluidizer. The fluidizer particulate materials are carried from the container by a stream of transport gas. A deflector placed over the container outlet constrains the fluid flow in a substantially horizontal path to prevent the outlet becoming blocked by the solids when the gas flow is cut off. The proportions of particulate material can be varied by selectively varying the pressure in the container, where the container is a pressure vessel.

7 Claims, 7 Drawing Figures

PARTICULATE SOLID STORAGE CONTAINER AND TRANSPORT METHOD

This application is a continuation of application Ser. No. 231,301, filed Feb. 3, 1981, for "Particulate Solid Storage Container and Transport Method", now abandoned.

DESCRIPTION

This invention relates to methods of and apparatus for the transport of particulate solids and to storage containers adapted for the delivery of particulate solids. It finds particular application in the feeding of pulverised coal from a storage hopper to a gasifier.

It is well known, for example in the operation of blast furnaces, to use a gas or mixture of gases to transport solid materials from a storage hopper to a furnace. The solid material is held in suspension and, having the properties of a fluid, can be transported by means of pipes, valves and the like. One such application is disclosed in U.S. Pat. No. 3,230,016 which describes a storage container for blast furnace materials.

One problem associated with the transport of particulate solids by suspension in gases is that when flow is shut down the solids settle in a mass which is difficult to re-mobilise when it is desired to restart the flow. This problem is especially acute in the vicinity of the outlet pipe or pipes from a storage container, which pipes may easily become blocked or bridged over by the settled solids. In order to overcome this problem a storage container is provided with a modified outlet to inhibit the settling of particulate solids in the vicinity of the outlet or outlets.

According to the present invention there is provided a storage container for particulate solids comprising gas inlet means, fluidising means for mixing a gas or gases and said particulate solids to produce a fluid mixture and outlet means at or adjacent the base of said storage container wherein said outlet means is provided with deflector means to cause said fluid gas mixture to move substantially horizontally immediately prior to entering said outlet means and to inhibit said particulate solids from falling directly into said outlet means.

The invention will now be particularly described by way of example with reference to the accompanying drawings in which.

Figure 1:
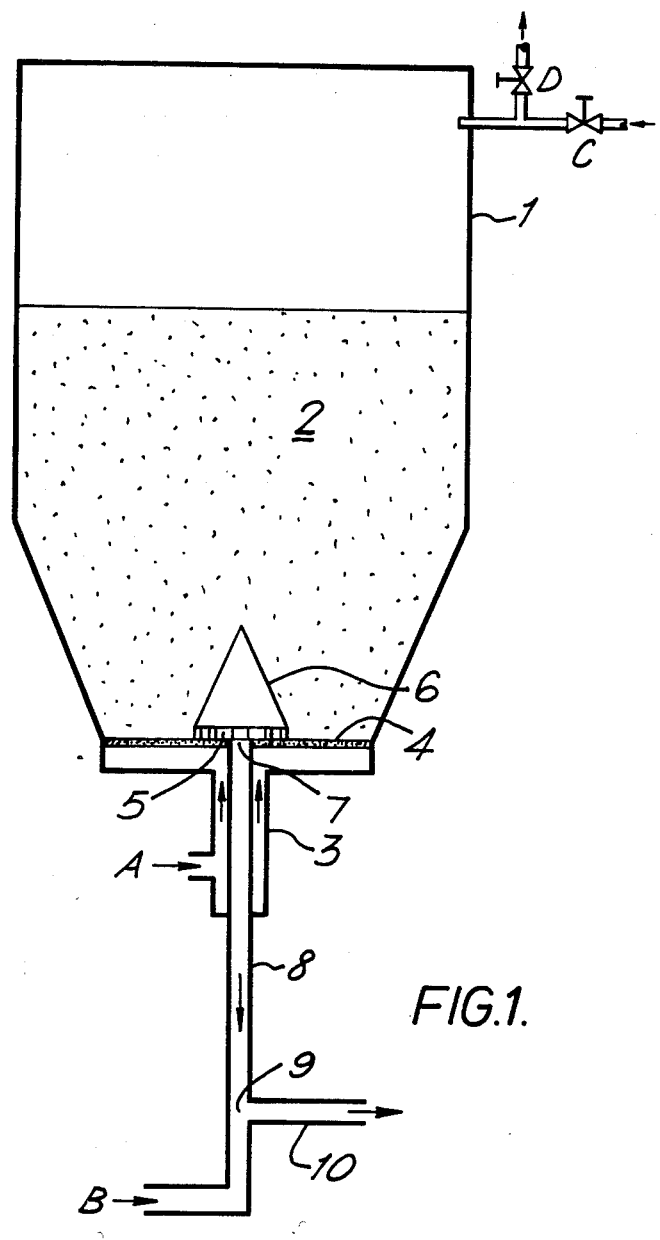
FIG. 1 shows diagrammatically a storage hopper having gas transport means and an outlet in accordance with the invention.

Referring now to FIG. 1 of the drawings, a closed hopper 1 is partially filled with pulverised coal 2. Dry nitrogen at a pressure of 380 lbs/in$^2$ g is introduced at point B as a particle-transporting gas. This also pressurises the hopper through an outlet pipe 8 while normally flowing through a transport pipe 10. Once the hopper-pressurizing flow through the pipe 8 reduces to zero, additional nitrogen, which serves as a lubrication gas, is introduced at point A and enters the hopper through an inlet pipe 3 and a sintered plate 4 having 20 $\mu$m pores therein. This partially fluidises the pulverised coal which passes through constrictions 5 in the base of a conical deflector member 6 positioned over the end 7 of an outlet pipe 8. The partially fluidised pulverised coal mixes with the transporting gas at the junction 9 with the transport pipe 10 which leads to the tuyeres of a slagging coal gasifier (not shown).

The proportions of the pulverised coal may be varied by adjusting the aforementioned transport and lubrication gas flows and/or by selectively further pressurising or exhausting the hopper by means of a pressurising gas inlet C or an exhaust outlet D.

Figure 2:
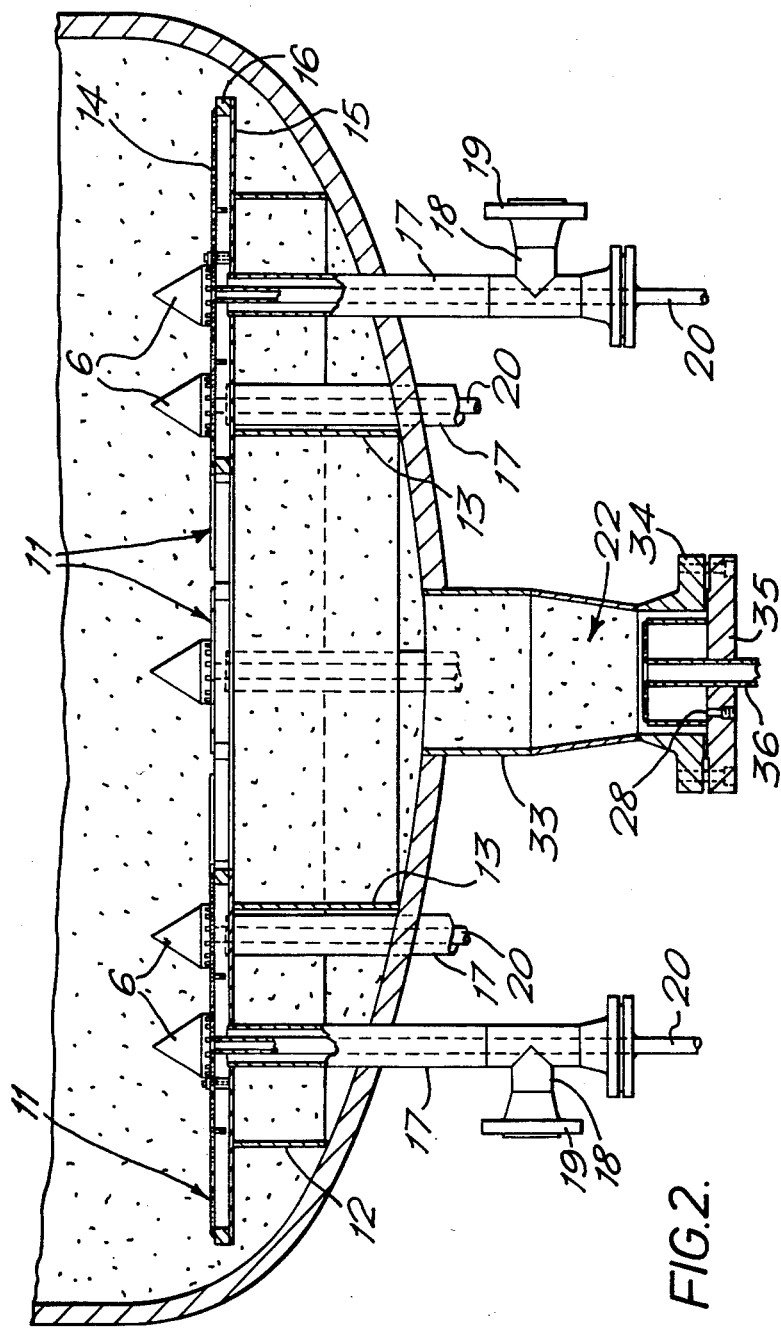
FIG. 2 is a cross-section taken through the base of a practical embodiment of the storage hopper of FIG. 1.
Figure 3:
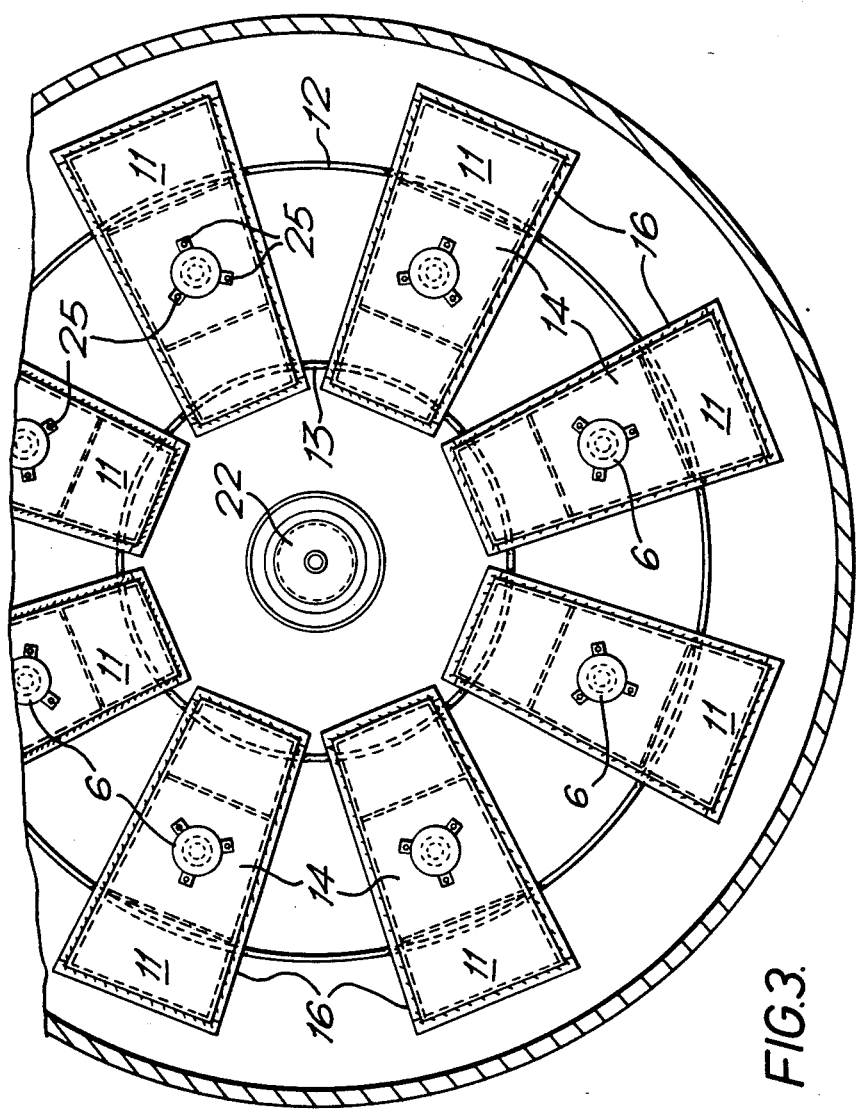
FIG. 3 is a plan view of the outlet means of the storage hopper shown in FIG. 2.

Details of the construction of the hopper are shown more fully in FIGS. 2 and 3. A plurality of fluidising members 11 rest in a level position on an outer 12 and an inner 13 support ring. The members 11 are tack-welded to the support rings which themselves simply rest on the inner surface of the hopper wall. The fluidising members 11 are of sandwich construction having an upper porous plate 14 and a lower sheet metal plate 15 separated by a spacer frame 16. Lubrication gas is introduced into each fluidising member 11 by way of an inlet pipe 17 which is connected to the gas supply by means of an access pipe 18 and coupling flange 19. The fluidised particulate solids leave the storage hopper by way of an outlet pipe 20 coaxial with the inlet pipe 17. An access port 22, is provided in the base of the hopper for exhausting the fuel below the members 11 for maintenance purposes.

Figure 4:
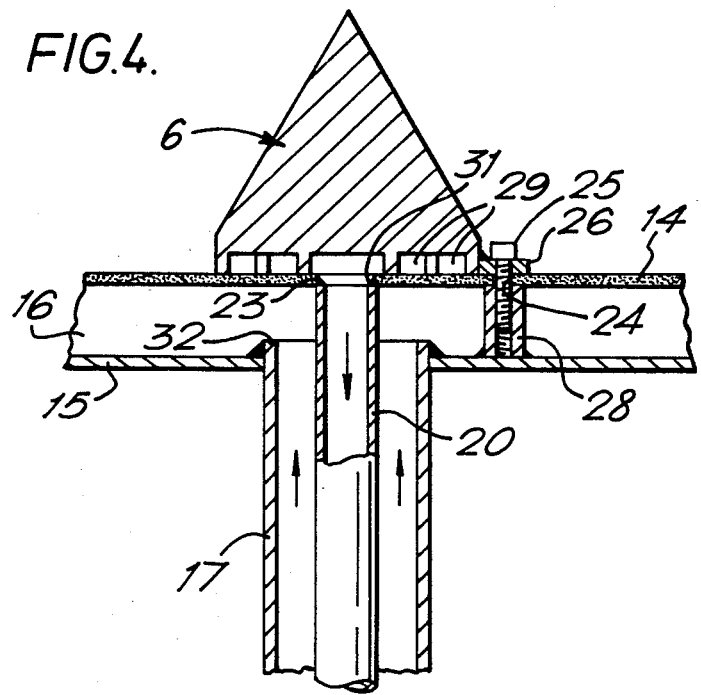
FIG. 4 is a section showing the construction of an outlet from the storage hopper of FIG. 2.
Figure 5:
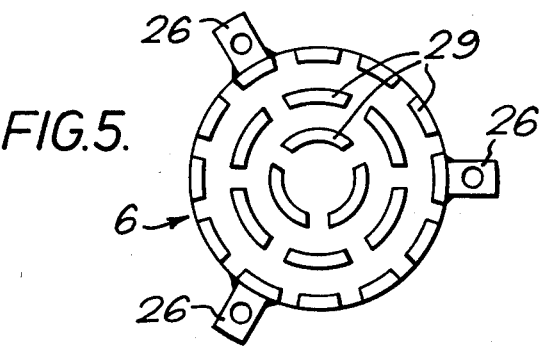
FIG. 5 is an underneath plan of the outlet shown in FIG. 4.

A conical deflector member 6 and the connection of the inlet and outlet pipes 17 and 20 to the fluidising member 11 are shown in greater detail in FIGS. 4 and 5. The upper porous plate 14 is of substantially trapezoidal shape and has a central hole 23 for the outlet pipe 20 and three smaller holes (only one of which is seen) for retaining the plate 14 and the mounting flanges 26 of the conical deflector member 6 by mounting screws 25 which are screwed in threaded separator members 28 fixed to the lower plate 15.

Constrictions 29 in the base of each deflector member 6 provide a passage to the outlet pipe 20, the end 31 of which is trimmed and welded to the sintered plate 14 in its hole 23. The outlet pipe 20 is mounted coaxially within the inlet pipe 17, the end 32 of which is, in turn, welded to the lower plate 15 of the fluidising member.

Figure 6:
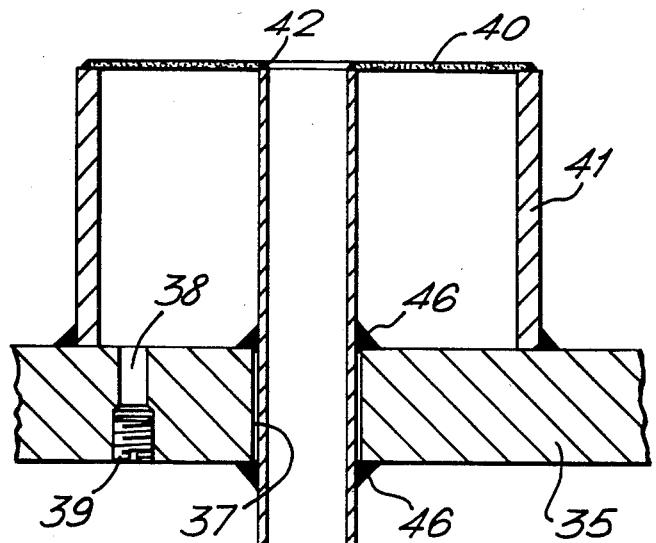
FIG. 6 is a section through the bottom connection pipe to the hopper.
Figure 7:
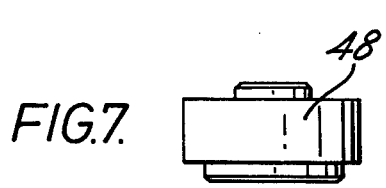
FIG. 7 is a portion of a jig used in the construction of the storage hopper.

The maintenance access port 22 (FIGS. 2,6) comprises a tubular member 33 mounted in the bottom wall of the hopper and having a flange 34 at its lower end. A cover plate 35 is attached to the flange and an outlet pipe 36 is welded at 46 through a central aperture 37 in the plate 35. An access hole 38, normally provided with a plug 39, permits compressed gas to be introduced below a sintered plate 40 when it is desired to exhaust the hopper. A spacer ring 41 separates the porous plate 40 from the plate 35. The upper end 42 of the outlet pipe 36 is welded to the rim of an opening in the porous plate 40. A further flange 43 is butt welded at 45 to the lower end of the outlet pipe 36 and this flange is normally provided with a closure plate 44. The hopper is constructed by inserting sections comprising the support rings 12 and 13 and welding them into complete rings. The upper edges of the support rings 12 and 13 are ground to provide a level support for the fluidising members 11. An assembly of frame 16 and lower plate 15 is mounted in position and the inlet pipes 17 then welded in place. The assembly 15,16 is then tack-welded to the support rings. The spacers 28 are positioned on the assembly using a jig 48 (FIG. 7) and tack-welded. The jig 48 is removed and the welds completed. The pulverised fuel outlet pipes 20 are placed in position, trimmed to size and welded to the sintered plate 14. The conical deflecting members 6 are then assembled and mounted on the sintered plates 14, which are then welded to the frames 16.

In operation, the lubrication and pressurisation flows are cut off first. The particulate solids are deflected by the conical deflection members 6 and settle at the constrictions 29 where the flow can easily be restarted by again providing lubrication gas flow through the sintered plate 14. The outlet pipe and transport pipe are cleared by the transport gas before its flow is cut off.

Various modifications may be made without departing from the ambit of the invention. For example it is not essential that the deflecting members be conical in shape provided they serve the purpose of inhibiting the direct fall of material into the outlet pipes. A valve may be included in the outlet pipe to isolate the transport gas flow from the hopper.

Although the apparatus of this particular example has been described in relation to the transport of pulverised coal from a pressurised hopper to a slagging gasifier, it is of value in the transport of other particulate solids. A large particle may temporarily block one of the outlets, but whilst it wears away, the solids will continue to flow out of the remainer. Pressurisation does not occur if the particulate solids storage container is open-topped.

What I claim is:

1. A storage container for particulate solids comprising:
    an outer wall defining an enclosed chamber for the solids;
    a plurality of vertical outlet openings at or adjacent the base of the chamber permitting the particulate solids to exit downwardly from the chamber,
    an outlet pipe for each outlet opening, said outlet pipe extending downwardly from said outlet opening;
    a fluidizing means including a porous surface surrounding each outlet opening and extending horizontally therefrom;
    a gas inlet pipe means for delivering a pressurized gas to a location below said porous surface to pass therethrough to fluidize the particulate solids thereabove;
    means individual to each said outlet opening for constraining the solids to flow only in a substantially horizontal manner from a concentric, annular area located beyond each outlet opening to said outlet opening, said constraining means comprising
    a deflector having a flat base that is larger than said outlet opening; and
    means for horizontally mounting said deflector base spaced immediately above said outlet opening and at least an annular portion of said surrounding porous surface such that a generally annular horizontally extending passageway extends horizontally, laterally from said outlet opening between said deflector base and said porous surface, said spacing and hence said passageway having a vertical height such that the particulate solids remain fluidized from a delivered pressurized gas and flow only in a generally horizontal direction, and including a plurality of concentric rings of constrictions in said passageway, extending from said deflector base to said porous surface, each said ring comprising spaced apart segments such that a plurality of openings extend through said ring.

2. A storage container as claimed in claim 1 wherein the height of said passageway is smaller than the inside diameter of said outlet pipe.

3. A storage container as claimed in claim 1 wherein said ring segments are aligned such that a segment of one ring is located in front or behind the openings in the next adjacent ring so that there is no straight radial pathway through said constructions.

4. A storage container according to claim 1 including a sandwich construction comprising said porous surface and a lower plate held apart by separator means and defining therebetween a gas entry chamber which is coupled to said gas inlet pipe means.

5. A storage container according to claim 4 wherein said porous surface comprises an upper perforate plate formed of a sintered material.

6. A storage container according to claim 5 wherein said sintered material includes pores which are of the order of 20 $\mu$m in diameter.

7. A storage container according to claim 1 wherein the container is a pressure vessel, further including gas pressure adjusting means connected to said vessel operable to selectively vary the gas pressure in the vessel whereby to vary the proportion of particulate solids in said gas.

* * * * *